No. 896,266. PATENTED AUG. 18, 1908.
T. K. BARLEY.
COMBINED DRAG AND CARRIER TRUCK.
APPLICATION FILED FEB. 29, 1908.
2 SHEETS—SHEET 1.
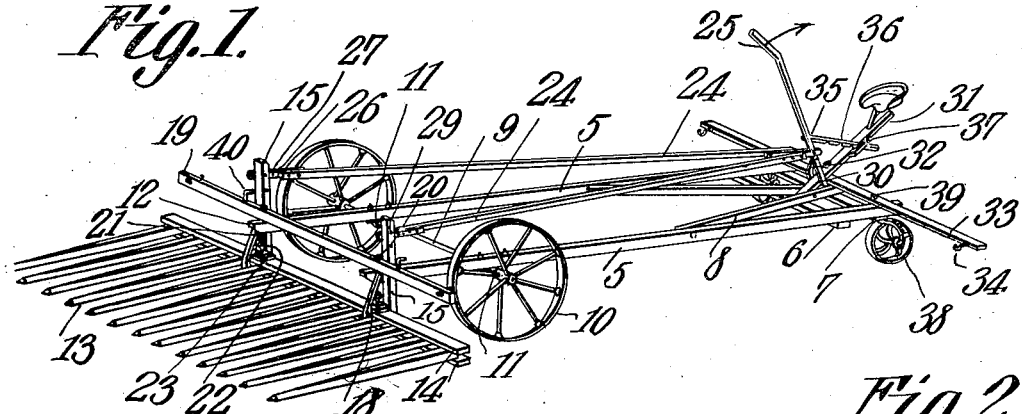
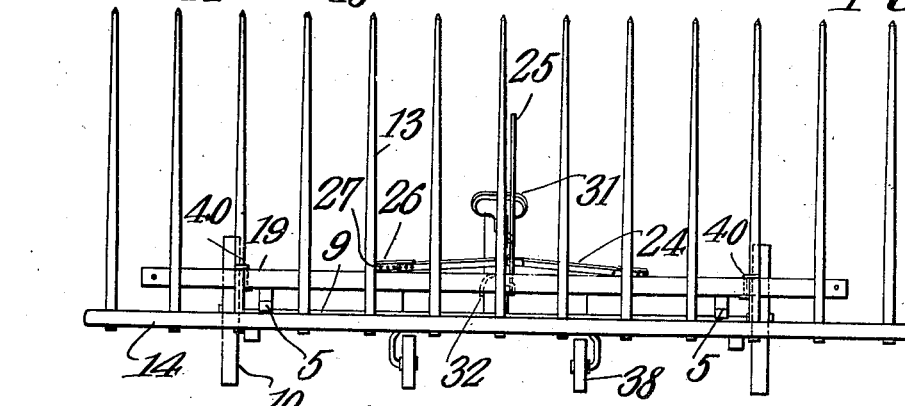
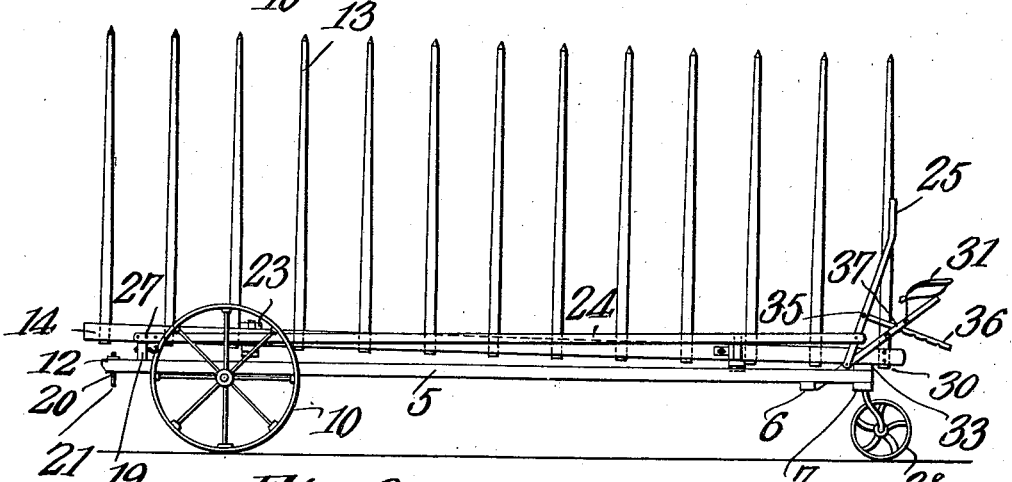
Witnesses
Inventor
Thomas K. Barley.
By C. A. Snow & Co.
Attorneys No. 896,266. PATENTED AUG. 18, 1908.
T. K. BARLEY.
COMBINED DRAG AND CARRIER TRUCK.
APPLICATION FILED FEB. 29, 1908.
2 SHEETS—SHEET 2.
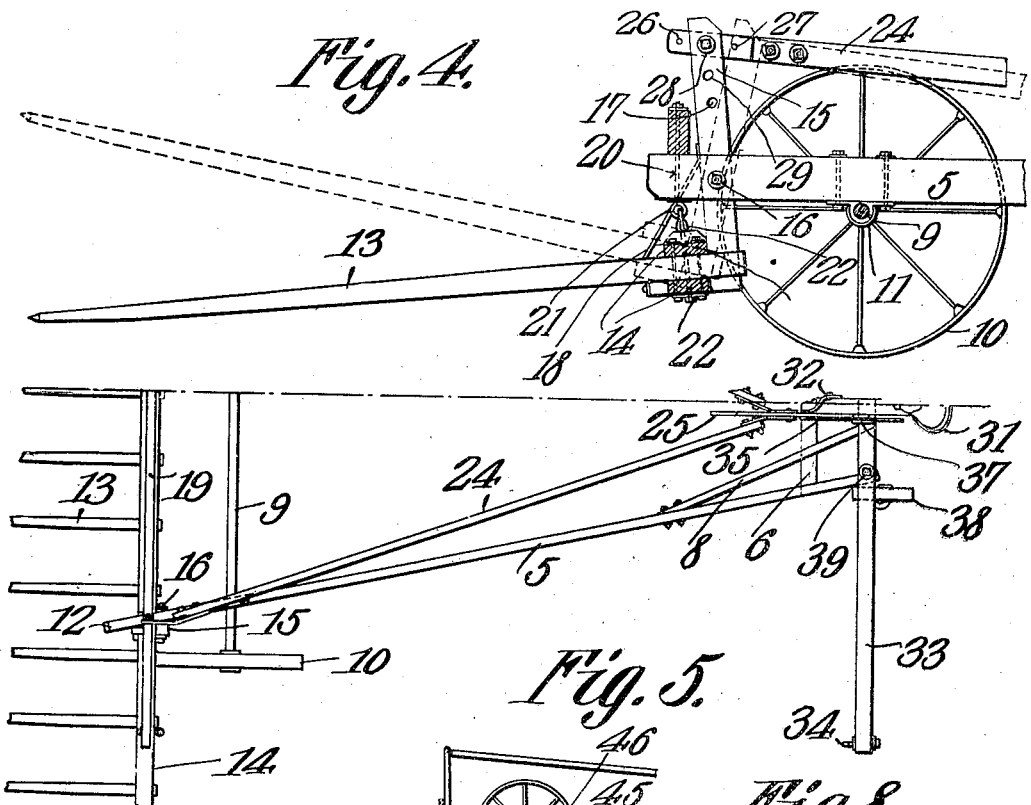
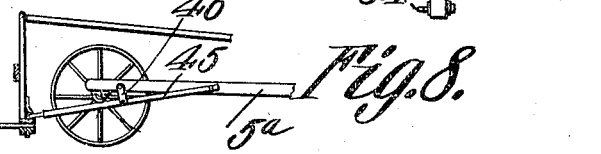
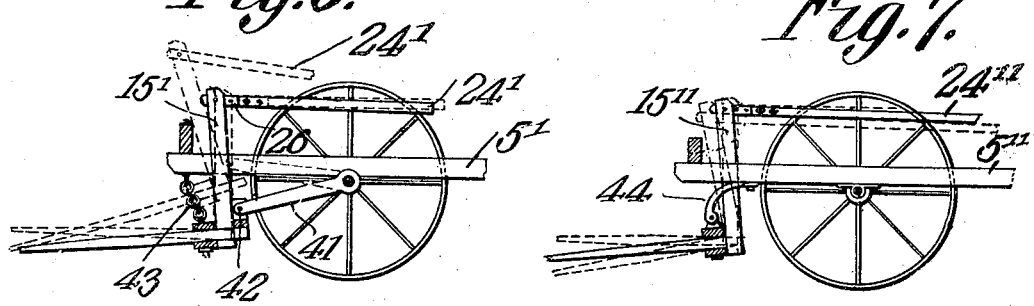
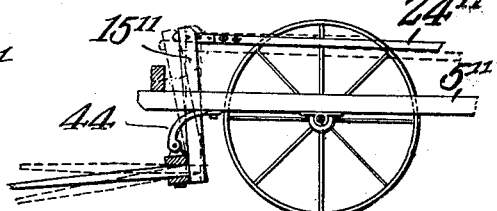
Witnesses
Inventor
Thomas K. Barley.
By
Attorneys

UNITED STATES PATENT OFFICE.

THOMAS K. BARLEY, OF SEDALIA, MISSOURI.

COMBINED DRAG AND CARRIER-TRUCK.

No. 896,266.　　　　　Specification of Letters Patent.　　　Patented Aug. 18, 1908.

Application filed February 29, 1908. Serial No. 418,592.

*To all whom it may concern:*

Be it known that I, THOMAS K. BARLEY, a citizen of the United States, residing at Sedalia, in the county of Pettis and State of Missouri, have invented a new and useful Combined Drag and Carrier-Truck, of which the following is a specification.

This invention relates to a combined horse rake and carrier truck and more particularly to a truck especially designed for use in connection with push rakes and for attachment to harrows, weeders and other cultivators.

The primary object of the invention is to provide a truck or carriage the frame of which is extended longitudinally beyond the front axle of the vehicle to form a support for a hay gathering device or rake, the front traction wheels being relatively large so as to render the truck easy to propel and thus lighten the draft when gathering a load.

A further object is to provide a carrier truck having a rake or fork mounted for tilting movement in advance of and below the horizontal plane of the front axle of the truck so that the rake may be readily adjusted to receive or discharge the load without danger of the teeth piercing the ground and becoming broken or otherwise mutilated.

A further object is to provide a rake or fork capable of being swung upwardly to vertical position at the forward end of the truck, and which may also be disconnected from the side bars of the frame and placed in position on top of the truck during transportation.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a combined hay rake and carrier truck constructed in accordance with my invention. Fig. 2 is an end elevation of the same showing the rake or fork in vertical position at the forward end of the truck. Fig. 3 is a side elevation showing the fork or rake detached from the side bars and in position on top of the truck for transportation. Fig. 4 is a vertical sectional view of the forward portion of the truck shown in Fig. 1. Fig. 5 is a plan view of one-half of the truck. Fig. 6 is a vertical sectional view illustrating a modified form of the invention. Fig. 7 is a similar view illustrating a further modification. Fig. 8 is a vertical sectional view of another form of the device.

Similar numerals of reference indicate corresponding parts in all of the figures of the drawings.

The improved truck forming the subject matter of the present invention includes a supporting frame consisting of longitudinal side bars 5 converging towards the rear end of the frame and connected by transverse bars 6 and 7, there being diagonal brace bars 8 secured to the side bars 5 and intersecting the transverse bars 6 and 7, as shown.

Extending transversely across the diverging ends of the side bars 5 is an axle 9 upon which is mounted for rotation suitable traction wheels 10, said axle being fastened to the lower longitudinal edges of the side bars by clips or similar fastening devices 11.

The forward ends of the side bars 5 are preferably inclined or beveled and extended longitudinally beyond the axle 9 to form supports 12 for attachment to a hay rake, harrow, weeder, cultivator or similar device.

In the present instance a rake or fork 13 is shown in connection with the truck, said rake comprising a head consisting of spaced transverse bars 14 between which are secured in any suitable manner the usual teeth or tines. The fork or rake is rigidly secured to a pair of tilting posts or standards 15, which latter are pivotally mounted at 16 on the projecting ends or supports 12 of the side bars and are pierced at their upper ends by a series of perforations 17. Suitable inclined braces 18 extend between the bars 14 and tilting posts 15 in order to form a rigid connection between the same. Resting on the free ends of the supports 12 is a transverse bar 19, which latter forms a stop for the hay and serves to prevent accidental displacement of the load during the gathering operation. The stop bar 19 is secured to the terminals 12 of the side bars 5 by bolts 20, the lower ends of which are provided with eyes 21 for pivotal connection with the eyes of similar bolts 22 carried by the fork or rake. The bolts 22 extend through the bars 14 comprising the rake head and also pierce suitable reinforcing blocks 23 mounted on the upper transverse bar 14 of the rake head, as shown.

Attention is here called to the fact that the traction wheels 10 are of relatively large diameter, while the rake or fork is suspended in advance of and in a substantially horizontal plane below the plane of the axle 9 so as to permit the rake to be readily manipulated in gathering and discharging the load.

Pivotally connected with the upper ends of the tilting bars 15 are combined push and lift bars 24, which latter preferably extend the entire length of the truck frame and are pivotally connected with a hand operating lever 25. Secured to the opposite ends of the converging bars 24 are metal straps or plates 26 having one or more perforations 27 formed therein for the reception of bolts 28, which latter form pivotal connections between the adjacent ends of the bars 24 and the handle 25, and tilting posts 15, respectively, there being one or more transverse perforations 29 formed in the posts 15 and handle 25 so as to permit the bars 24 to be adjusted vertically of the same.

The lower end of the lever 25 is pivotally mounted at 30 on an inclined seat bar 31 carried by the reduced end of the truck frame, said lever being bifurcated to form an arm 32 which extends through the seat bar 31 and forms the pivotal axis of the lever 25. The seat bar 31 is interposed between the diagonal braces 8, at the juncture of the latter, with its lower face resting on the transverse draft bar 33. The opposite ends of the draft bar 33 are extended laterally beyond the adjacent side bars 5 and are provided with suitable draft devices 34 for connection with a whiffle tree so that the draft animals may travel on opposite sides of the truck or carrier.

It will here be noted that the opposite ends of the rake or fork project laterally beyond the wheels 10 so that the draft animals may travel on raked ground.

Pivotally mounted at 35 is one end of a rack bar 36, the opposite end of which extends through a loop or keeper 37 mounted on the seat bar 31 whereby the lever may be actuated to lock the fork or rake in load receiving or dumping position. Pivotally mounted on the rear or reduced end of the truck frame are caster wheels 38, the shanks of which extend through the bars 7 and 33 and are clamped in position thereon by suitable nuts 39. It will thus be seen that under normal conditions the rake or fork 13 is supported substantially parallel with the ground so that as the rake is pushed forward by the draft animals the hay will be deposited on the rake.

When the load has been received, the operating lever 25 is moved in the direction of the arrow indicated in Fig. 1 of the drawings which elevates the front end of the rake or fork above the ground and thus prevents accidental displacement of the load when transporting the latter to a stack.

In order to dump the load the lever 25 is moved in the opposite direction which tilts the posts or standards 15 and lowers the points of the teeth or tines of the rake so that when the carriage is moved in a rearward direction the load will be deposited on the ground at said stack.

When moving the rake to different portions of a field the bolts 28 are removed and the rake or fork swung upwardly to the vertical position, shown in Fig. 2 of the drawings, and in which position it may be rigidly clamped to the stop bar 19 by means of angular bolts or clips 40 mounted for rotation in said stop bar and adapted to engage the tines of the rake, as shown.

When it is desired to transport the rake any great distance the rake or fork is detached from the front end of the supporting frame, by removing the bolts 16 and 28, and placed in position on top of said frame, as best shown in Fig. 3 of the drawings, the rake being supported on the frame by bolts or other fastening devices.

When the rake is supported on top of the frame the truck carrying the rake may pass over bridges, culverts and the like or through farm gates and along public highways, thus saving time and trouble in loading the rake on a farm wagon for transportation.

It will here be noted that the forward traction wheels 10 are considerably larger than the rear wheels 38, said forward wheels being preferably three to five feet in diameter so as to render the truck easy to propel when transporting the rake. It will also be noted that the rake head is without wheels and is supported independently of the forward wheels 10 by the projecting ends of the side bars of the frame.

In Fig. 6 of the drawings there is illustrated a modified form of the invention in which the tilting bars or standards 15' are slidably mounted on the projecting ends of the frame 5' instead of being pivoted thereto, as shown in Fig. 4. In this form of the device the rake head is supported by crank arms 41, which latter are pivotally mounted on the forward axle of the truck and pivotally connected with the rake head at 42, there being a chain or other flexible medium 43 extending between the projected ends of the frame and the rake head, as shown. It will thus be seen that when the push bars 24' are moved to one of the dotted line positions shown in Fig. 6 the terminals of the tines will be elevated to support the load during transportation and when the bars 24' are actuated to move the rake to the other dotted line position, the load may be readily discharged from said rake.

In Fig. 7 of the drawings there is illustrated a further modification in which the rake or fork is suspended from the extensions of the side bars of the frame 5" by curved brackets 44, which latter are pivotally connected with the rake head, the bars or standards 15″ being secured to the rake head at the rear of the latter with their upper ends pivotally connected with the push bars 24″, in the manner before described.

A further modification is illustrated in Fig. 8 of the drawings in which the rake is supported in advance of the forward ends of the side bars 5ª by means of inclined bars 45 each having one end thereof fastened to the adjacent bar 5ª and its opposite end pivotally connected with the rake head, there being short bars or hangers 46 disposed at or near the forward axle of the truck for suspending the inclined bars 45 from the truck frame.

While it is preferred to use a rake or fork in connection with the truck or carriage it is obvious that a harrow, weeder or cultivator may be supported from the forward end of the truck, if desired.

From the foregoing description it is thought that the construction and operation of the device will be readily understood by those skilled in the art and further description thereof is deemed unnecessary.

Having thus described the invention what is claimed is:

1. A wheeled truck including a frame having one end thereof projected longitudinally beyond the front wheels of the truck, a gathering device pivotally mounted for tilting movement on the projecting end of the frame and disposed in a plane below the axle of the front truck wheels, and means for moving the gathering device to load receiving and dumping positions.

2. A wheeled truck including a frame having one end thereof projected longitudinally beyond the front wheels of the truck, a gathering device mounted for tilting movement on the projecting ends of the frame and disposed in a plane below the axle of the front truck wheels, an operating lever, and means forming a connection between the operating lever and gathering device for moving the latter to load receiving and dumping positions.

3. A wheeled truck including a frame having one end thereof projected longitudinally beyond the front wheels of the truck, standards pivotally mounted on the projecting ends of the truck, a rake secured to the lower ends of the standards and disposed in a plane below the axle of the forward truck wheels, an operating lever, and means connecting the operating lever and upper ends of the standards for moving the rake to load receiving and dumping positions.

4. A wheeled truck including a frame having one end thereof projected longitudinally beyond the front wheels of the truck, standards pivotally mounted on the projected ends of the frame, a rake rigidly secured to the lower ends of the standards and disposed in a plane in advance of and below the plane of the axle of the forward truck wheels, an operating lever, bars forming a pivotal connection between the operating lever and upper ends of the standards for moving the rake to load-receiving and dumping positions, and means for locking the rake in either position.

5. A wheeled truck including a frame having side bars one end of each of which is projected longitudinally beyond the front wheels of the truck, a stop bar connecting the projecting ends of the side bars, standards pivotally mounted on said projecting ends, a rake secured to the lower ends of the standards, an operating lever, bars forming a connection between the operating lever and the upper ends of the standards for moving the rake to load-receiving and dumping positions, and fastening devices secured to the stop bar and adapted to engage the rake for securing the same in vertical position.

6. A wheeled truck including a frame having one end thereof projected longitudinally beyond the front wheels of the truck, standards pivotally mounted on the projecting end of the frame, a hay rake secured to the lower ends of the standards, a flexible connection between the rake and the projecting ends of the standards, an operating lever, and combined push and lift bars forming a pivotal connection between the upper ends of the standards and the operating lever.

7. A wheeled truck including a frame having one end thereof projected longitudinally beyond the front wheels of the truck, standards pivotally mounted on the projecting end of the frame, a rake rigidly secured to the lower ends of the standards, braces connecting the standards and rake, a stop bar extending transversely across the standards, a flexible connection between the rake and projecting end of the frame, an operating lever, and combined push and lift bars connecting the upper ends of the standards and the operating lever.

8. A wheeled truck including a frame having one end thereof projected longitudinally beyond the front wheels of the truck, standards pivotally mounted on the projecting end of the frame and having their upper ends provided with a series of perforations, a rake rigidly secured to the lower ends of the standards, an operating lever having transverse perforations formed therein, combined push and lift bars, perforated strap irons secured to the opposite ends of the push bars, a bolt passing through the perforations in the standards and the perforations in the adjacent set of strap irons, and a bolt passing through the operating lever and the other set of strap irons.

9. A wheeled truck including a frame having one end thereof projected longitudinally beyond the front wheels of the truck, standards pivotally mounted on the projected end of the frame, a rake secured to the lower ends of the standards, a stop bar extending transversely across the projected end of the frame in advance of the standards, an operating lever, combined push and lift bars forming a pivotal connection between the upper ends of the standards and the operating lever, said push and lift bars being adjustable vertically of the standards and lever, respectively.

10. A wheeled truck including a frame having one end thereof projected longitudinally beyond the front wheels of the truck, a hay gathering device pivotally mounted for tilting movement on the projecting end of the frame and disposed in a plane below the axle of the front truck wheels, the opposite ends of the hay gathering device being extended laterally beyond the sides of the frame, combined push and lift bars operatively connected with the hay gathering device, and a lever for operating said bars to raise and lower the hay gathering device.

11. A wheeled truck including a frame having converging side bars connected by transverse bars, diagonal braces connecting the side bars and transverse bars, a draft bar extending transversely across the rear end of the frame, a seat bar interposed between the braces and resting on the draft bar, the forward ends of the side bars being projected longitudinally beyond the front wheels of the truck, standards pivotally mounted on the projecting ends of the side bars, a rake secured to the lower ends of the standards, an operating lever pivoted to the seat bar, combined push and lift bars forming a pivotal connection between the operating lever and the upper ends of the standards, a keeper secured to the seat bar, and a ratchet pivotally connected with the operating lever and adapted to engage the keeper for locking the rake in load receiving and dumping positions.

12. A wheeled truck including a frame one end thereof projecting longitudinally beyond the front wheels of the truck, a transverse bar secured to the projecting end of the frame, a gathering device pivotally mounted for tilting movement on the projected end of the frame and disposed in a plane below the axle of the front truck wheels, said gathering device being movable to vertical position in engagement with the transverse bar, and fastening devices carried by the transverse bar and adapted to engage the gathering device for supporting the latter in vertical position.

13. A wheeled truck including a frame having one end thereof projected longitudinally beyond the front wheels of the truck, a removable gathering device pivotally mounted for tilting movement on the projecting end of the frame and disposed in a plane below the axle of the front truck wheels, means for moving the gathering device to load receiving and dumping positions, and means for supporting the gathering device on top of the truck when said gathering device is detached from the projecting end of the frame.

In testimony that I claim the foregoing as my own, I have hereto affixed my signature in the presence of two witnesses.

THOMAS K. BARLEY.

Witnesses:
R. F. HARRIS,
C. P. KECK.